Nov. 15, 1966 J. H. LEMELSON 3,286,033

APPARATUS FOR MAGNETICALLY RECORDING AND REPRODUCING AT A REMOTE STATION OVER A TELEPHONE LINE

Filed Aug. 30, 1960 2 Sheets-Sheet 1

INVENTOR.
JEROME H. LEMELSON

INVENTOR.
JEROME H. LEMELSON 3,286,033
Patented Nov. 15, 1966

3,286,033

APPARATUS FOR MAGNETICALLY RECORDING AND REPRODUCING AT A REMOTE STATION OVER A TELEPHONE LINE

Jerome H. Lemelson, 8B Garfield Apts., Metuchen, N.J.

Filed Aug. 30, 1960, Ser. No. 56,331
17 Claims. (Cl. 179—6)

Figure 1:
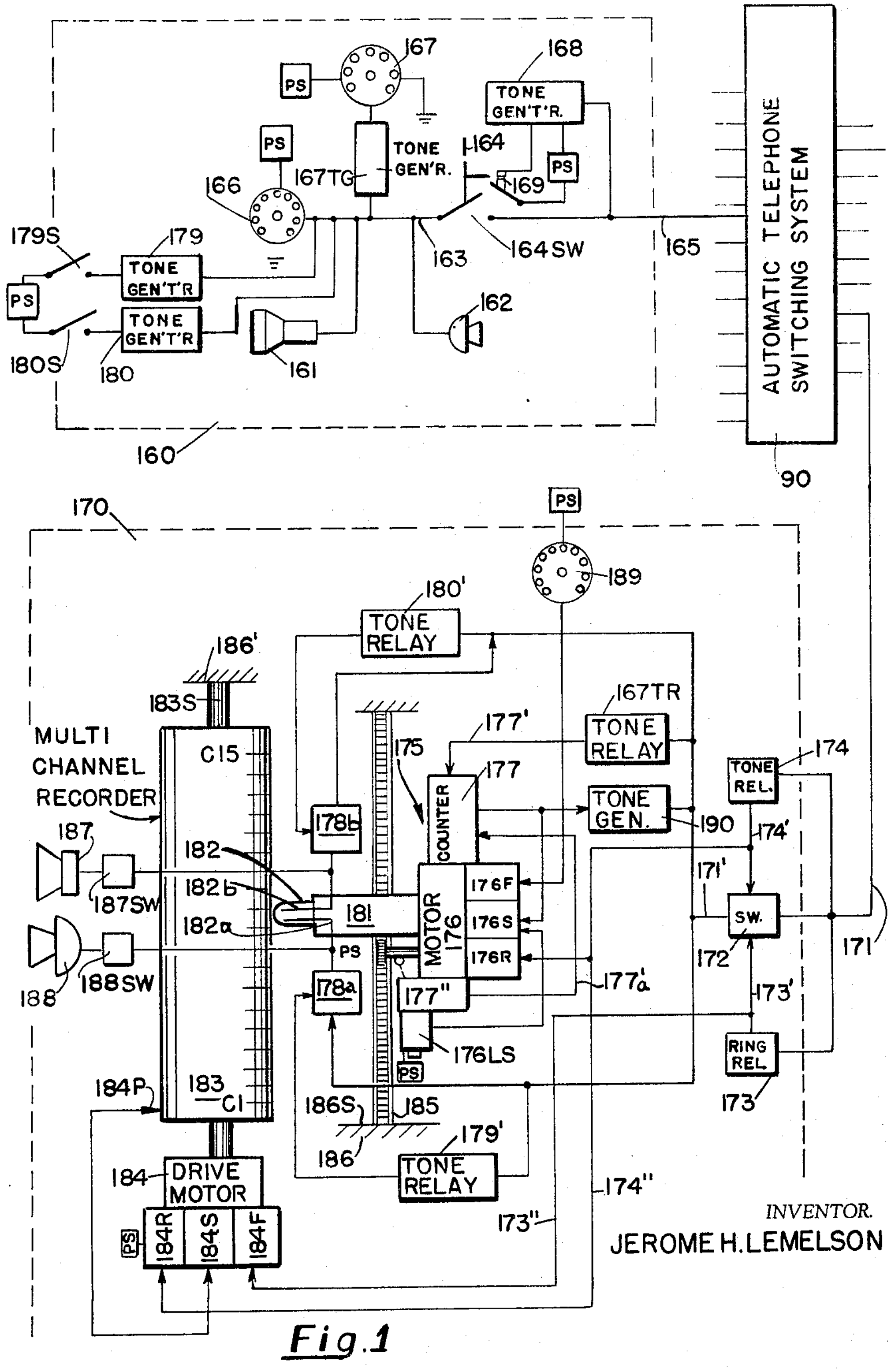

In the performance of communication functions relating to business activities, administrative personnel devote a large part of their time to the communication of orders, general information, dispatching, and the numerous other functions necessary to conduct a business by means of telephone conversation. A considerable amount of effort and time are often wasted when attempts are made by one party to communicate with another when the latter is not at or near one or more locations known to the first party. A solution to this problem has been to couple a recording device to the terminal circuit of a telephone line together with a transcribing device which informs the person calling the line that the party normally associated with the circuit is not present and thereafter directs him to leave a verbal message which is recorded on either an elongated magnetic recording member or an endless recording track. This apparatus suffers certain shortcomings which may reduce the amount of working time available to the administrator or executive using said apparatus. A primary shortcoming of such a message recorder is that the user thereof must devote his time to listening to the complete playback of all messages in the order received in order to scan the entire group of messages. As a result an important message which may be received, for example, near the end of the total recording, will only be arrived at in its turn. Furthermore, if two or more persons have access to and utilize the same message recorder, each must listen to the recorded messages of the other.

Accordingly, it is a primary object of this invention to provide a new and improved automatic information signal recording and reproduction apparatus having both selective recording and selective reproduction control means therefor.

Another object is to provide an automatic information signal recording and reproduction apparatus having a single magnetic recording device with a plurality of different magnetic recording areas thereof each of which is rapidly accessible to by a magnetic transducing means which is remotely controllable so that any selected of said recording areas may be recorded on or reproduced from and may therefor be assigned to different parties.

Another object is to provide a new and improved message recording and reproduction apparatus which may be coupled to a terminal circuit of a conventional telephone switching system and has means for selectively reproducing in any order a plurality of message signals recorded therein in a manner whereby messages of secondary importance may be rapidly by-passed.

Another object is to provide an automatic message recording and reproduction apparatus which may be coupled to a conventional telephone terminal circuit for recording messages received on said terminal circuit and which may be remotely controlled from another terminal circuit in the automatic switching system by means of signals to selectively reproduce messages recorded therein in any predetermined manner and/or selectively record one or more messages on one or more predetermined recording areas of said apparatus whereby a person not located in the immediate vicinity of said apparatus and desiring to hear one or more messages recorded therein may do so over the conventional telephone lines.

Another object is to provide an automatic recording and reproduction apparatus which may be coupled to a conventional telephone terminal line and which may be controlled for the selective recording and reproduction of messages by means of signals generated on said line, said apparatus including a portable means for generating control signals whereby a person connected to said terminal line via any telephone in the system may either record on a selective channel of said apparatus or reproduce from a predetermined channel thereof.

Another object is to provide apparatus for the automatic transmission of message signals between a central station and a plurality of substations at the will of the personnel at the substations which apparatus also provides means whereby said substation personnel may effect the automatic recording of message signals in a predetermined manner and on to predetermined areas of a magnetic recording means located at said master station, thereby eliminating the need for one or more personnel to receive and record messages.

Another object is to provide a supervisory message recording system which is easily applicable to an automatic switching and connection system of the conventional telephone type, whereby use may be made of the conventional switching and connection apparatus thereof for communicating between an individual and an automatic recorder or plural automatic recorders.

Another object is to provide new and improved portable signal generation and transmission apparatus for the automatic remote control of machinery and switching apparatus.

With the above and other objects in view as may hereafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

In FIG. 1, an automatic switching and connection system 90, such as an automatic telephone switching system, is provided having plural terminal circuits, two of which, 163 and 171' are illustrated. The circuit 163 is shown as a conventional telephone terminal circuit with an ear piece 161 and a mouth piece 162 for receiving and transmitting voice signals on the output circuit line 165 thereof which extends to the automatic switching 90. The station 160 including terminal line 163, is shown wtih several modifications to its general circuitry for effecting remote control of apparatus at the recording station 170 containing terminal circuit 171'. The system may include a plurality of signal transmission stations such as 160, each of which is connectable to the terminal line 171' for recording signals onto predetermined recording areas or tracks of a magnetic recording member 183 thereat.

The apparatus of FIG. 1 will be described by describing a connection and recording cycle. Assuming that the operator of station 160 desires to record a message or other signal onto a predetermined recording area of the recording means 183 of station 170 so that said signal may be selectively reproduced thereafter, he first completes the circuit between his terminal line 163 and the voice pair lines 165 extending to the automatic switching system 90. This may be done by lifting the receiver of the conventional head piece of the telephone at station 160 which automatically closes the telephone switch 164—SW. A dial selector switch 166 is then operated in accordance with the connection code necessary to effect the connection between 163 and the line 171 extending from switching system 90 to station 170. When a connection is made through the automatic switching system 90, a so-called ring signal is developed on line 171. This ring signal energizes a relay 173 which is responsive only thereto. The output 173' of 173 is connected to a switching input of a bi-stable switch 172 and, when said signal is developed on 173', the switch 172 closes. The switch 172 may be a bi-stable switch operative to close when the relay 173 becomes energized and to open when a second relay 174 becomes energized.

The ring signal developed on line 171 thus completes a circuit between the terminal lines 163 and 171'. The signal recording and reproduction station 170 is provided with a magnetic recording and reproduction system which comprises a magnetic recording member or members and magnetic recording and reproduction transducers which are mounted on the common base and are movable relative to said magnetic recording member to a plurality of recording positions or channels thereof. In FIG. 1, the magnetic recording means comprises a magnetic recording drum 183 adapted to rotate on a shaft **183*s* and is power operative to rotate at a constant speed by means of a motor and drive unit 184. The notations C–1 to C–15 refer to 15 circular recording tracks or channels each located a a different longitudinal position along the drum 183**. The drum, of course, may be replaced by a wide band magnetic recording belt and motor driven transport therefor or by a plurality of magnetic recording tapes arranged side by side in accordance with said patent application Serial Number 515,417.

A magnetic recording and reproduction transducing means 182 is mounted on a carriage 181 which is movable parallel to the surface of the drum 183 along a track 185 which is supported at both ends on a frame or mount 186. A motor drive unit 176 mounted on 181 has a gear wheel adapted to engage the track 185 whereby it is operative to propel the carriage 181 therealong. The notations 176F, 176S and 176R refer respectively to the forward, stop and reverse drive controls for the motor drive unit 176. When said controls are pulsed, they respectively effect the forward drive, stoppage and reverse drive of the housing or carriage 181 along track 185. Positional control of the carriage to travel to a selected transducing position along recording member 183 whereby the transducing means 182 may be operative to record on or reproduce from a selected said channel, is effected by means of a controller 177 which may comprise a presettable predetermining counter relay and designed in accordance with the teachings of my said parent patent applications. The predetermining controller 177 is a counter adapted to energize a relay therein which pulses the stop control 176S for the motor drive 176 when said counter it has received a predetermined number of feed-back pulses from a limit switch 177'' which is geared or coupled to the shaft of drive motor 176, said feed-back pulses being indicative that the carriage has travelled a predetermined distance from a home or at rest position at one end of the track. The method of remotely presetting the predetermining counter 177 comprises generating a predetermined number of pulse signals on the connected circuit by means of a pulse generator at station 160 and transmitting said pulses to a predetermining input 177' to 177. The pulse generator is a second dial switch 167 which, when operated, intermittently energizes a tone generator 167TG, the output of which is connected to the line 163 so that said presetting pulse signals are transmitted as a plurality of pulse signals or a train of tone signals to the input line 171'. Particular tone signals are employed so that other signals transmitted on the connected circuit will not energize or affect the predetermining counter 177. The tone signals passed through switch 172 are passed therefrom to the input of tone responsive relay 167TR the output of which is the input 177' to the predetermining counter 177. Each time tone responsive relay 167TR receives a tone signal from tone generator 167TG, it provides a pulse on the line 177' which is effective in presetting predetermining counter 177. The output of tone responsive relay 167TR is also passed to the forward start control 176F of motor drive unit 176 and the carriage immediately is driven away from its home position near the end support 186S for the track 185. As the carriage 181 moves, the switch 177' intermittently closes and opens and gates pulses on line **177'*a* as a feed-back signal to counter 177. When 177 receives the same number of signals on line 177*a* that its presetting input 177' received from relay 167TR, a relay therein transmits a signal to the stop control 176S and the motor drive unit 176 stops the carriage with the transducing unit 182 positioned in alignment with a selected channel of the recording member 183**.

Employing the apparatus of FIG. 1 the operator at station 160 may conduct two way communications with the station 170. That is to say, he may either record a predetermined signal or message on a predetermined of the plural recording channels of recording member 183, or may effect the reproduction of a signal or signals which may be already recorded on a selected of said channels whereby said selected reproduced signal is transmitted over the connected wires back to his station for the recording thereof, visual or audio monitoring thereof. Controls are therefore provided for selectively effecting either the recording of a selected signal on a predetermined channel of recording member 183 or the reproduction of a signal recorded on a selected channel of member 183 and its transmission back to station 160. The operator at station 160 is provided with two controls. A first tone generator 179 is adapted when actuated by the operator by closure of switch 179S to transmit a tone signal of a different characteristic than that generated by tone generator 167TG, over the connected line to which a tone relay 179' located at station 70 is responsive. When tone relay 179' becomes energized, it actuates a normally open switch **178*a* and cause same to close which connects the input line 171' with the magnetic recording transducing circuit 182*a* of transducer 182 so that all signals received on line 171' thereafter are passed through the recording transducing portion of 182 and recorded. In the event that it is desired to reproduce from the selected channel, the operator of station 160 may manually actuate a second tone generator 180 by closing switch 180S to generate a tone on the connected circuit of a different characteristic than that generated by 179, said tone being transmitted to the input of a tone responsive relay 180' which effects the closure of a second switch 178*b* connecting the input line 171' with a reproduction transducer circuit 182*b* of the transducing head 182 so that when said head is operatively positioned relative to the selected channel of recording member 183, it will reproduce any signal recorded thereon which will be transmitted over the connected circuit back to the station 160. An ear piece 161 and speaker unit 162 of conventional design, are provided connected to the terminal circuit 163 for respectively receiving or transmitting message signals over the connected circuit. These may, of course, be replaced respectively by recording and reproduction transducers of a magnetic recorder adapted to record signals transduced by transducer circuit or head 182*b* and reproduce signals adapted to be transmitted and recorded on the member 183 by the head circuit 182*a***.

When the line 173' becomes energized, by activation of the ring responsive relay 173, the signal output of 173 is also transmitted on a circuit 173'' to a start control 184F for motor drive unit 184 which starts rotating the drum 183 and shortly thereafter drives it at constant speed for effecting said recording or reproduction functions. The motor in drive 184 may be stopped at the end of the recording or reproduction cycle by automatic means. When the operator of station 160 has completed his transducing cycle and opens switch 164–SW, a second switch 169 is momentarily closed by means of an arm 164' extending from the actuator 164 of the switch 164. The closure of switch 169 completes a circuit between a tone generator 168 and a power supply PS. The tone generator 168 is adapted, when so energized, to generate a tone of a different characteristic than any of those generated heretofore on the completed circuit to which the relay 174 is responsive. Energizing of relay 174 effects several actions. When the output 174′ of tone relay 174 becomes energized, it effects the opening of bi-stable switch 172 by activating a respective solenoid thereof. The line 174″ which extends from output 174′ of the tone relay 174 is connected to the stop control 184S of the motor drive unit 184. The energizing of 174 therefore also effects deactivating said motor so that the drum stops. The line 174′ is also connected to the reverse drive control 176R of the carriage drive unit 176 and said carriage 181 is reversely driven when 174″ is energized. A limit switch 176LS having an actuator arm protruding therefrom, is closed when said actuator arm engages the surface 186S at the end of the track 185. Said switch 176LS when so actuated, is adapted to pulse the stop control 176S of drive motor 176 so that the carriage comes to rest at the end af the track in a home-position.

It is noted that the relays 184F and 184S may also be adapted, when respectively energized, to connect all of the controllers, switches, relays and amplifiers necessary to effect the operation of the apparatus at station 170 and to disconnect said apparatus from a common power supply. In this way, the apparatus may be turned off so that it does not drain power when not in use and automatically energized just prior to the aforementioned transducing functions after circuits 173″ and 174″ are energized.

For locally recording onto selected channels of the recording drum 183 and reproducing messages therefrom which may have been recorded from remote locations such as station 160, from predetermined channels thereof, a reproduction speaker and amplifier means 187 is provided which is connected by means of a manual switch 187SW to the reproduction transducing circuit 182*b* of unit 182. A recording microphone 188 is also connectable by means of a switch 188SW to the recording transducer circuit 182*a* of unit 182 for recording messages onto predetermined channels of recording member 183. To locally preposition the transducer head 182 for recording or reproduction relative to a selected of the multiple channels of member 183, a pulse generator 189 in the form of a dial switch is provided which is connectable directly to line 177″ for presetting the predetermining counter 177 in accordance with the number of pulses transmitted from 189 thereto. The controls 184F and 184S are therefore preferably also manually operative at the station 170 so that an operator wishing to record onto a predetermined of the plural channels of recording member 183 or reproduce therefrom, may manually connect the power supply to all of his control apparatus by closing switch 184F and when finished, may disconnect said power supply by operating switch 184S or opening switch 184F.

It is further noted that if the station 160 is a conventional telephone circuit containing merely a dial switch 166 of the conventional type and an ear piece 161 as well as a mouth piece for the receipt and transmission of voice signals, the operator may effect the same functions as described by carrying a portable signal generator powered by a battery having signal generating means such as switch 167 connected to tone generator 167TG, tone generator 168, tone generators 179 and 180, all of which connect to a common transducer such as a speaker for transducing said signals to sound, such as a speaker. By placing said speaker close to or abutting the mouth piece 162 of the conventional telephone, after making the connection between the terminal circuits 163 and 171′, the aforedescribed connection and control functions may be effected or simulated in the manner described. For example, the tones generated by any of said tone generators when said transduced to sound signals having predetermined charactersitics, will when transduced back to electrical signals through the mouth piece 162 to generate respective electrical signals having predetermined tone or frequency characteristics to which the relays 174, 167TR, 179′ and 180′ will be respectively responsive, so that the described functions may be accomplished at the receiver station 170.

Further variations in the operation of the recording and reproduction apparatus of FIG. 1 are noted. The recording and reproduction apparatus is intended to perform a plurality of important communication functions between persons without the necessity that at least one of said persons be present at the time a message is transmitted or recorded. With minor modifications, the apparatus of FIG. 1 may be utilized by anyone to whom a telephone is available which is operatively connectable to the terminal station containing the automatic magnetic recorder and reproduction apparatus. The modifications would necessarily include, means such as described, for generating control signals on the connected voice wire pair to effect the described functions. This may be effected in several manners including, in addition to the direct coupling of electrical tone generators to the output circuits of the terminal line 163 as illustrated in FIG. 1, the use of sound tone generators which are connected to a common loudspeaker which may be held near the mouthpiece 162 of the conventional telephone or the use of a magnetic transducer which may be held against the housing of the telephone and, by induction, induce the respective frequency control signals on the connected line. Furthermore, it is noted that the earpiece transducer 161 of FIG. 1 may be a magnetic reproduction transducer of a magnetic recorder operative in accordance with one of my copending applications to automatically transmit one or more information signals of a video or audio nature over the connected line for recording onto a selected channel of the recording means 183 after automatic reproduction thereof from the recording medium of the first mentioned magnetic recorder of control signals necessary to effect the prepositioning and control of the movable recording means of station 170.

Further features of the apparatus of FIG. 1 include means for indicating to the person at station 160 who may desire to effect a recording on a selected channel of the multi-channel recording member 183 when the magnetic transducer 182 is in alignment with a channel selected as the result of selective operation of the tone pulsing means 167. The output of counter relay 177 which occurs when said counter uncounts and transducer head 182 is adjacent or approaching the selected channel, is passed, in addition to the stop control for motor 176, also to the energizing input of a tone generator 190. The output of tone generator 190 is connected to line 171′ and passes over the connected telephone circuit to the input line of station 160. Tone generator 190 may generate an audible tone which when heard by the operator at 160 will indicate to him that he may shortly thereafter commence speaking into the mouthpiece 162 to relay the desired message. It is noted that tone generator 190 may also be used to energize a message transcribing unit such as a conventional record player for transmitting a voice message to the operator of 160 which states that he is coupled to the selected channel and that he may commence speaking. Such a position indicating message may also be reproduced by the reproduction transducing means 182 or by a separate reproduction transducer and transmitted over the completed circuit. The context of the message may state that the recording head is adjacent channel 8 or whatever channel it is aligned with and the party may start speaking. Since such an apparatus will be used by a plurality of persons each of whom has a specific channel assigned to him for recording messages to be later played back by the same or different persons, and it may be desired by said persons to effect reproduction from selected channels from remote locations, the reproduction of a different message identifying the channel the transducer is in alignment with each time the transducer moves to a channel location and comes to rest against the recording medium. Features of such a message reproduction means are illustrated in FIG. 2 and described hereafter.

In the event that it is desired to return the magnetic recording medium 183 to a "starting" or "home" position whereby the beginning of all recorded messages starts essentially at the same element of the drum or position of the tape, such a function may be effected by using the output of the end-of-message relay 174 to not only stop the drive motor 184 but to effect its reversal by energizing a reverse control 184R, which reverse drive continues until the stop control 184S is again energized by means of a pulse recorded at the proper position along the circumference or length of 183 and reproduced by a pick-up transducer 184P for stopping drive motor 184 with record member 183 at said "home" position.

So as not to record one signal over another, the recording transducer 182*a* may be provided with a signal erasing means such as an erase head provided adjacent the recording transducer and in a position to erase any signals already on the channel prior to recording. Such an erasing transducer may be automatically energized by gating the necessary power signal through a switch such as 178*a* to said erase head which switch closes when the record-tone relay 179' becomes energized, and opens in response to the signal generated by tone generator 168.

Figure 2:
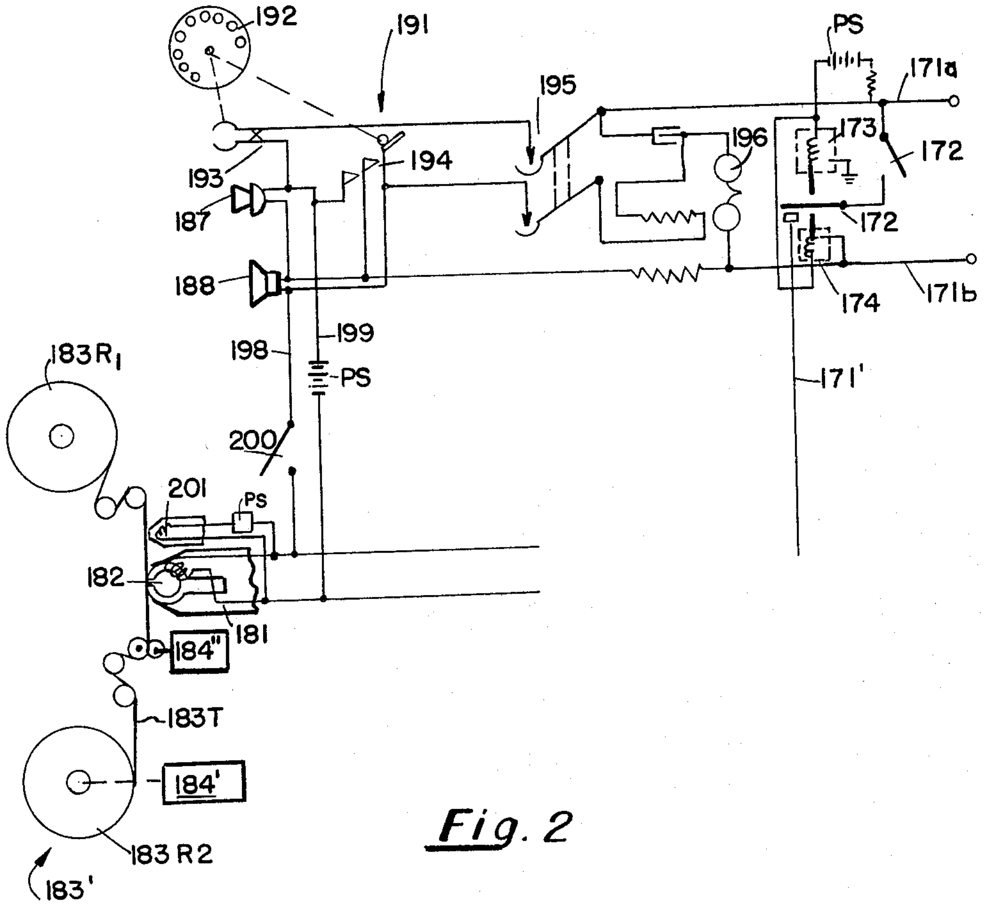

A further improvement in the apparatus of FIG. 1 is shown in FIG. 2. With the components of FIG. 2 provided as part of the apparatus of receiving station 170 of FIG. 1, the same telephone voice wire pair which is used for effecting the automatic magnetic recording and reproduction functions heretofore described may also be used for direct voice communication. In other words, a conventional telephone terminal circuit containing the conventional heat set, line connection means and the associated ring relay may be utilized with minor modification thereto as illustrated so that said circuit may also be utilized for selective recording and/or reproducing as described without rendering the circuit inoperative for the transmission and receipt of conventional telephone voice conversational signals when operated by a person communicating directly with someone else in the system.

The apparatus provided at a modified station 170' comprises conventional telephone terminal circuitry which includes in addition to a microphone 187 and earpiece 188, a rotary dial switch 192 which operates impulsing switch 192 for generating selection and connecting signals on the wire pair 171*a*, 171*b* and short circuiting contacts 194 which prevent the impulsing sound from being generated on the earpiece line. The notation 195 refers to the conventional telephone hook operated phone switch and 196 to the ringing bell of the phone. The switch 172 of FIG. 1 is connected in parallel with the wire pair 171*a*, 171*b* and is operated to open and close by relays 173 and 174 as described. A manually operative switch 172*a* is provided in series with the switch 172 and may be opened when it is desired to prevent the remote control of an access to the recording and reproduction apparatus connected to the input line 171'.

The telephone earpiece and mouthpiece may also be used to effect a recording of a message or to listen to a reproduced message. In parallel with the circuits of mouthpiece 187 and earpiece 188 are conductors 198 and 199 which have in series circuit therewith a switch 200, a power supply PS and the coil of the recording-reproduction transducer unit 182. When the switch 200 is closed by the operator at the station 170' and switch 172*a* is opened, selective reproduction of signals recorded on the recorder 183' may be effected by prepositioning the magnetic transducer 182 in alignment with a selected channel of the recording medium, which, in FIG. 2 comprises an elongated, multi-channel magnetic belt 183T driven between two drums. For selective reproduction and playback through the earpiece 188 of the telephone, the reproduction circuit of transducer 182 is actuated by manual switching means (not shown) by the operator and the driving of the tape 183T is effected by manually operating the starting switch of the motor which drives the tape drive capstan. The notation 201 refers to an erase head in alignment with the transducer 182 and mounted on its carriage which head is automatically urged into engagement with the recording member or belt 183T when recording is in progress so that the prior recording will be erased prior to the recording of new matter.

Also shown in FIG. 2 is the aforementioned means for reproducing a message identifying the channel which the transducer 182 is aligned with. It is assumed that the magnetic recording medium 183T is provided with a plurality of pairs of recording channels, each pair consisting of a message channel against which the transducer 182 is adapted to ride and an auxiliary channel containing a recorded message identifying the channel against which an auxiliary transducer 182' mounted on 181 adjacent 182, is adapted to ride and reproduce said identifying message. The output 182' is passed to the terminal circuit 171' and over the connected circuit to the remote station connected to 170'.

The apparatus of FIG. 1 permits the recording a predetermined information signal or message onto a predetermined area or track of a plural track magnetic recorder for selective reproduction therefrom at a later time. Selective area recording may be effected as described by selectively positioning a movable magnetic recoding transducer so that it is in a position relative to one of a plurality of recording tracks of a magnetic recorder and may be used to record any signal generated on its input thereafter on said track, after which said recording transducer may be moved to any other selected track or may return to a home-position until commanded thereafter to seek another track or channel for recording thereon. Another method of effecting this function is to use plural recording transducers each on a stationary mount and each adapted to record on and/or reproduce from a respective channel of a plurality of channels on a singular magnetic recording belt or a plurality of tapes all of which are driven simultaneously or are each selectively driven past respective of said recording heads as described in my said copending application. Selective connection of a circuit between either a recording or reproduction transducer which is adjacent a particular tape or channel and the circuit 171', may be effected from the remote station 160 by means of tone or pulse codes generated as described. In other words, a different tone responsive relay may be associated with a respective bi-stable switch for connecting, when energized by respective tones, a respective transducer with the line 171'. Located at each of the terminal circuits such as 160 are respective switch operated tone generators for generating at least two tones, one to effect a connection with a respective recording transducer for recording messages onto a respective channel of the magnetic recording member and the other to connect the operator thereof with a transducer and means for reproducing from the same or another channel of said member. Disconnection and opening of the bi-stable switch upon completion of the recording or reproduction function may be effected by the transmission of the same tone signal whereupon the operator may first reproduce a recorded message then record a message in its place or on an adjacent channel. Or disconnection may be automatically effected when switch 172 operates to open as described. Local recording and/or reproduction of signals may be effected by manual operation of a switch provided for each transducer which connects the selected transducer associated with the desired channel with either 187 or 188.

In still another form of selective recording control in which a plurality of transducers are provided with at least three transducers (a record, an erase and a reproduction head) adapted to transduce signals relative to a single channel or recording area, it is noted that the transducers for each channel may be selectively connectable to the recording station terminal circuit by means of respective signals transmitted from a sending station if each transducer circuit extends to a respective terminal of a rotary stepping switch which is operated by a tone responsive relay operating the servo or solenoid which operates said stepping switch, said relay being operative by trains of tones generated, for example, by the units 167 and 167TG of FIG. 1. Thus, for example, if it is desired to operatively connect the transducer which is connected to the sixth terminal of the stepping switch, the operator at the sending station, after making a connection with the input line of the recording station, has merely to dial or otherwise effect the generation of six tone signals which will pulse the stepping switch servo solenoid six times by operation of the tone responsive relay and, provided that the stepping switch is at a neutral or starting position, the switch will be stepped to the position to make the desired connection. Return of the stepping switch to a zero or starting position may be effected by means of a servo motor coupled to the drive shaft of the switch arm the start control for which is energized either by the output of a further tone responsive relay which is energized by a further tone transmitted from said sending station and/or by the output of a station disconnect relay such as 174 of FIG. 1 which operates when the recording station becomes disconnected from the automatic switching system. The stop control of the servo returning the stepping switch to zero may be automatically energized by means of a limit switch operated by the shaft of the switch or wiper arm when it returns to said zero position. As a result, the operator of any sending station or user of any telephone in the automatic phone system may record onto a selected recording area or channel of the recorder or reproduce a signal from a selected channel the selection of which is immediately determined by the operation of a tone generating device such as 167, 167TG of FIG. 1. If it is desired not to avail every person using the system with means for operatively connecting his terminal circuit with all of the transducers at the recording station, then his tone generating means 167, 167TG may be operative to generate only those tone trains or codes which will effect an operative connection with a selected channel or channels. The rotary pulse generating device 167 may therefore be replaced by a code or pulse train generator adapted to generate only a single code or number of pulses when operated.

In concluding it is noted that other forms of erasible recording media may be provided for the recorder 183 which forms do not employ magnetic recording means.

I claim:

1. Magnetic recording and reproduction apparatus comprising in combination:

(a) a signal generating station including means for generating a plurality of control signals and information signals, (b) a switching system including means for communicatively connecting said signal generating station with a receiving station which includes a magnetic recorder and reproducing unit having an input which is operatively connectable to the input of said receiving station, (c) means at said generating station for operatively connecting an output circuit thereof to the input of said receiving station, (d) said magnetic recorder comprising a magnetic recording unit having a plurality of recording channels and having further means selectively operable in response to a signal transmitted to said receiving station from said sending station for selectively recording a signal onto a predetermined of said channels and means for selectively reproducing signals from a selected of said channels, (e) said selective recording means including a controller having switching means for effecting selective recording, (f) said switching means being controllable by relay means which is responsive to signals of predetermined frequency or tone, (g) said relay means being operatively connected to the input to said receiving station and being responsive to operate said switching means upon receipt of a predetermined signal from said sending station, (h) means at said sending station for generating on the completed circuit a predetermined tone signal to which said relay means is responsive whereby to effect the operation of said relay means at said receiving station for recording signals onto a predetermined channel of said magnetic recorder prior to the generation at said sending station of an information signal, (i) and means controlled by said sending station for disconnecting the circuit to said receiving station after the transmission of an information signal thereto and its recording onto a predetermined recording channel of said magnetic recorder.

2. An information signal recording and reproduction system comprising in combination:

(a) a sending station including means for generating a plurality of control signals and an information signal, a plurality of receiving stations, (b) means for operatively connecting the output of said sending station to the input of one of said receiving stations, (c) an automatically operative recorder at said receiving station having a magnetic recording medium with plural magnetic recording channels, (d) said magnetic recorder having a movable magnetic recording transducer adapted to be selectively positioned for magnetic transducing relative to a selected of said plural recording channels, (e) presettable predetermining control means including a servo motor and a predetermining controller therefore adapted for prepositioning said transducer, (f) means for presetting said control means for said servo means to effect a predetermined movement of said magnetic transducing means relative to said magnetic recording medium, (g) said presetting means being responsive to a plurality of predetermined signals generated on its input, (h) the input of said presetting means being operatively connected to the input of said receiving station, (i) means at said sending station for generating control signals for presetting the condition of said predetermining control means and (j) means for generating at said sending station and transmitting to said transducer of said receiving station an information signal after said transducer has been operatively coupled to the predetermined channel of the magnetic recording medium of said magentic recorder whereby said information signal is magnetically recorded thereon.

3. Apparatus in accordance with claim 2 including means at said receiving station for generating a signal which is transmitted back to said sending station when said transducer is operatively coupled to a preselected channel of the magnetic recorder and means at said sending station for converting said signal into a form whereby it may be utilized to indicate said prepositioning of said transducer.

4. Apparatus in accordance with claim 2, whereby the means for generating said signals at said transmitting station comprises a manually operative tone generator adapted for selectively generating a predetermined number of audio tones, means for electro-magnetically coupling said tone generator with said terminal line whereby tones generated thereby will appear as signals of predetermined frequency on said connected circuit and will be transmitted to said terminal circuit to which said magnetic recorder is operatively connected, and means for utilizing said signals for presetting said predetermining control means thereat.

5. Apparatus in accordance with claim 1, said signal generating means comprising a tone generator adapted to generate sound tones, the means for operatively connecting the output of said sending station with said receiving station comprising a telephone switching system in which said sending and receiving stations are respective terminal circuits thereof, said sending station having a telephone operatively connected thereto and including a microphone and a speaker, said generator being operatively connectable to said microphone of said telephone whereby its sound tones are transducible thereby to electrical tone signals over a connection through said switching system to said receiving station for operating said relay means.

6. An automatic system for the transmission and transcribing of message signals comprising, in combination with a telephone switching system and a plurality of terminal circuits which are connectable to each other by conventional switching means:

(a) a signal generating means which is operatively connectable from one of said terminal circuits to a second terminal circuit thereof, (b) said second terminal circuit being operatively connected to a magnetic recorder adapted for receiving and transcribing on a recording medium thereof message signals transmitted to said terminal circuit, (c) said magnetic recorder having a plurality of recording areas and a magnetic transducer which is movable by means of a servo drive means into operative positions relative to each of said recording areas for transducing relative thereto, (d) a control means including a positioning controller operatively connectable to said terminal circuit and adapted for controlling the operation of said servo-drive means whereby to preposition said transducer relative to a predetermined of said recording areas for transcribing.

(e) said control means being responsive to plural control signals, generated on said terminal circuit, which are adapted for effecting the prepositioning of said transducer, (f) said signal generating means adapted for generating said plural control signals after the connection has been made between said terminal circuits which are transmitted to said control means and will effect the presetting of said positional controller, (g) means, after the completion of said circuit, for starting said servo drive means for moving said transducer and for controlling its movement in accordance with said control signals, (h) means operative by further control signals for repositioning said transducer relative to a further recording area, and (i) means for automatically repositioning said transducer at the end of a transducing cycle when a disconnection is effected with said sending station in a home position from which it can be repositioned during another transducing cycle.

7. An automatic recording and reproduction system comprising in combination:

(a) a recording and reproduction station having an input which is a terminal line of an automatic switching system, (b) said recording station having a magnetic recorder having a recording medium with plural recording channels thereof each of which is accessible to a magnetic transducer which is movable along a guide means in a path parallel to said magnetic recording medium and may be selectively moved into operative engagement with a selected of said channels for effecting the recording of signals onto said channel and reproduction of said signals therefrom, (c) said transducing means being mounted on a base having a motor operatively connected thereto, (d) a predetermining controller for said motor, (e) said predetermining controller capable of being preset by the transmission of signals to a first input thereof, (f) a feedback signal generator mounted on said base for said transducing means and having an output which is connected to a feedback signal input to said predetermining controller, (g) said feedback signal generator adapted to generate a pulse signal each time the base for said transducing means moves a predetermined distance relative to said recording medium, (h) a relay in said predetermining controller adapted to become energized when a null condition has been reached therein which exists when the signals received by its feedback signal input are equal in number to the signals received by its presetting input, (i) said relay of said predetermining controller being operatively connected to a means for stopping the movement of said mount for said tranducing means with said transducing means positioned for transducing relative to a predetermined of said channels, (j) and means thereafter for automatically magnetically coupling said transducing means and a predetermined channel of said recording medium whereby signals may be transduced between the two, (k) said transducing means including a magnetic recording means and a magnetic reproduction means, (l) a switching means for operatively connecting either said recording or said reproduction means in circuit with a power supply, (m) said switching means being operative by a signal operated relay having a switching input connected to the input to said recording apparatus, and (n) means at said sending station for transmitting a signal to the receiving station after the connection has been made therewith for energizing said relay for conditioning said apparatus for either magnetically recording onto said selected channel or reproducing therefrom.

8. Apparatus in accordance with claim 1, the means at said sending station for generating said control signals comprising a plurality of tone generators each adapted when energized by operation of a respective control switch therefore, to generate a tone signal of a predetermined frequency characteristic, the control means for said magnetic recorder at said receiving station comprising a plurality of tone responsive relays each of which is energizable to operate upon the receipt of a respective tone signal generated by a respective of said tone generators to effect a respective control function.

9. Recording and reproduction apparatus comprising in combination, a signal transmission station including means for generating a plurality of switching and connection control signals and information signals, a switching system including means for communicatively connecting said signal generating station with a receiving station, a recorder at said receiving station having an erasable recording medium, reproduction transducing and recording transducing means operatively connectable to the input of said receiving station, means at said sending station for operatively connecting its output circuit with the input of said receiving station through said switching system, said recorder including a plurality of recording areas and having means for selectively recording different information signals onto selected of said recording areas and means for selectively reproducing previously recorded signals from selected recording areas, said recording means including a control means having switching means for selectively coupling the input to said receiving station with a selected recording area through a selected transducing means, a relay means for controlling said switching means, said relay means being operatively connected to the input of said receiving station and being responsive to operate said switching means upon the receipt of a predetermined signal from said sending station, means at said sending station for generating control signals on the completed circuit to which said relay means is responsive whereby to effect the operation of said control means at said receiving station for coupling a selected and predetermined transducing means area of said recorder for either immediately recording on or reproducing from said selected recording area, and means controllable from said sending station for disconnecting the circuit of said receiving station from the circuit of said transmission station.

10. A remote controlled recording and reproduction system comprising in combination:

(a) an automatic multi-channel switching and connection communication system, (b) a recording and reproduction station having an input which is a terminal line of said automatic switching system, (c) a recorder at said station having an erasable recording means including plural parallel recording channels, (d) a recording and reproduction transducing means, (e) a base support for said recording and reproduction transducing means, (f) means for guiding said base in a predetermined path across said parallel recording channels, (g) motor drive means operatively coupled to said base for moving it across said recording channels, (h) a predetermining controller for positioning said base to align said transducing means with a selected channel by controlling said drive means, (i) signal responsive means for presenting said controller, remote means for generating predetermined signals on said terminal line for energizing said signal responsive means and presetting said controller, (j) feedback signal generating means operative in response to the movement of said base along said predetermined path and having an output which is connected to said controller, (k) control means for deactivating said drive means and stopping said base in a predetermined position when a null condition has been reached in response to signals generated by said remote signal generating means and said feed back signal generating means indicating the prepositioning of said base relative to a predetermined recording channel, (l) switching means for energizing either said recording or said reproduction transducing means and operatively coupling either with a selected recording channel, said switching means being responsive to a predetermined signal generated on said terminal line, and (m) means at another terminal line of said switching and connection system for generating and transmitting a signal to said recording and reproduction station after a connection has been made therewith for energizing said switching means and conditioning said transducing means for either recording onto a selected channel or reproducing therefrom,

11. A magnetic recording and reproduction system comprising in combination:

(a) a monitor station including means for generating a plurality of control signals, (b) a receiving station for certain of said control signals, (c) an automatic switching and connection system including means for communicatively connecting said monitor station with said receiving station, (d) a magnetic recording unit at said receiving station including a magnetic recording means having recording channels defined by a plurality of circular recording tracks of similar radius, means for rotating said magnetic recording means to simultaneously rotate said circular tracks about a common axis including a motor operatively connected to said recording mean, (e) transducing means for reproducing signals from selected of said tracks, (f) a controller having switching means for effecting the operative coupling of said transducing means with a selected of said tracks, (g) means at said monitor station for operatively connecting an output thereof to the input of said receiving station, (h) reproduction control means at said receiving station including a controller having switching means operable for effecting the gating of signals transduced from selected of said tracks on the circuit connection with said monitor station, (i) said reproduction control means including a switching means controllable by a relay means, (j) said relay means being operatively connected to be energized in response to said control signal transmitted from said monitor station and further signals generated at said receiving station to effect the reproduction of predetermined signals recorded on selected of said circular recording tracks of said recording means an the transmission of the reproduced signals on the connected circuit to said monitor station.

12. Apparatus in accordance with claim 11 in which certain of said circular recording tracks contains magnetically recorded voice recordings which are reproducible as audio signals and transmittable for audio monitoring at said monitor station.

13. A communication and recording system in accordance with claim 11 including recording transducing means at said receiving station for recording signals onto selected of said recording tracks of said magnetic recording unit, a further monitor station in said system remote from said receiving station and including signal transmitting means, means for operatively coupling said signal transmitting means with the input to said receiving station recording transducing means, control signal generating means at said further station for generating a plurality of control signals on said transmitting means, means at said further station for generating information signals, control means at said receiving station operative in response to said control signals for operatively coupling said information signal generating means with said recording transducing means for recording signals onto selected of said plurality of recording tracks to add recording thereto which are accessible for remote controlled reproduction and transmission to said monitor stations.

14. In a communication system:

a sending station including a telephone having a mouth-earpiece, a receiving station including multiple channel recording means for selectively recording messages and means for playing back selected recorded messages, an automatic telephone switching and connection system, said sending and receiving stations connected to terminal circuits of said automatic switching system, first means responsive to the ring signal developed on the output of said terminal circuit of said receiving station for connecting the input line thereof to said switching system, a portable manually actuated control signal generating means at said sending station operative to generate a plurality of sound signals of particular characteristics and each transducible as selective tone signals for transmission to said receiving station by coupling said generating means to the mouthpiece of said telephone when a connection is established with said receiving station, first control relay means at said receiving station responsive to a first of said control signal for selectively operating said recording means for playing back recorded messages from selected channels of said recording means and coupling same to the terminal circuit thereof to permit a person at said sending station to listen to selected recorded messages and second control relay means at said receiving station responsive to a second of said control signals for operating said recording means for selectively recording messages in said recording means.

15. A communication system in accordance with claim 14, said portable manually actuated control signal generating means being battery powered and operative to generate an audible sound signal of a predetermined tone characteristic, said control relay means being responsive to the electrical tone signal generated on the connected line as transduced by the mouthpiece of said telephone when said battery powered signal generating means is activated and coupled to said telephone mouthpiece.

16. A communication system comprising in combination:

a sending station including a telephone having a mouth-earpiece, a receiving station including means for recording and playing back recorded messages, an automatic telephone switching and connection system, said sending and receiving stations connected to terminal circuits of said automatic switching system, first control means responsive to the ring signal developed on the output of said terminal circuit of said receiving station for connecting the input line thereof to said switching system, said recording means comprising a multi-channel erasable recorder having recording and reproduction transducing means operative for recording onto and reproducing from selected channels, means for coupling said transducing means to the input to said terminal circuit when a connection has been made between said receiving and sending stations, second control means for operatively coupling said transducing means with a selected recording channel, third control means for effecting activation of either the recording or reproduction transducing means, said second and third control means being operative in response to specific tone signals generated at said sending station and transmitted on the connected circuit to said receiving station, and, means at said sending station for generating a plurality of tone signals in different arrays and transmitting same to said receiving station for activating said second and third control means for respectively coupling the input of said receiving station with a selected of said channels of said recording means and selectively switching said transducing means to perform either the recording or reproduction function, said tone signal generating means being operative while a connection is made between said sending and receiving stations to effect recording on or reproduction from selected of a plurality of said recording channels.

17. Apparatus for selecting and reproducing recorded messages comprising in combination, a multiple channel magnetic recorder and reproducing unit having a plurality of magnetic sound tracks each having different messages recorded therein, first magnetic transducing means operative to selectively reproduce messages from selected of said tracks, control means for said recorder including means for operatively coupling said first transducing means with a selected track for reproducing a selected recording therefrom, a monitor station located remote from said recorder, an automatic telephone switching system, second transducing means for connecting said monitor station with a first terminal circuit of said switching system, third transducing means for connecting said recorder control means and said first transducing means with a second terminal circuit of said switching system whereby said first and second terminal circuits are connectable to each other through said switching system by the selective operation thereof, said monitor station including means for receiving signals generated by said first transducing means and sound transducing means operative for transducing said received signals to sound messages, selection means at said monitor station for activating said control means to couple said first transducing means with said monitor station sound transducing means and a selected track thereat, means operative thereafter for causing operation of said recorder to move said selected sound track past said first transducing means whereby the selected signal recorded on said selected track is reproduced thereby and transmitted to said sound transducing means for reproducing sound transcriptions thereof, and means operative after transducing the selected messages for deactivating said control means and shutting down the recorder.

References Cited by the Examiner

UNITED STATES PATENTS

| | | | |
|---|---|---|---|
| 1,993,870 | 3/1935 | Bellineau | 179—6 |
| 2,124,488 | 7/1938 | Grondahl | 179—5 |
| 2,200,351 | 5/1940 | Whitehead et al. | 179—6 |
| 2,385,968 | 10/1945 | Deakin | 179—6 |
| 2,478,514 | 8/1949 | Townley | 179—5 |
| 2,733,425 | 1/1956 | Williams et al. | 340—174.1 |
| 2,751,274 | 6/1956 | Andrews | 346—74 |
| 2,783,303 | 2/1957 | Fontaine et al. | 179—7 |
| 2,799,726 | 7/1957 | Van Deventer | 179—6 |
| 2,832,841 | 4/1958 | Eldridge | 179—1 |
| 2,914,752 | 11/1959 | MacDonald | 340—174.1 |
| 2,949,502 | 8/1960 | Logan | 179—6 |
| 2,979,568 | 4/1961 | Logan | 179—1 |

FOREIGN PATENTS

| | | |
|---|---|---|
| 417,924 | 10/1934 | Great Britain. |
| 421,059 | 12/1934 | Great Britain. |

BERNARD KONICK, *Primary Examiner.*

IRVING SRAGOW, L. M. ANDRUS, *Examiners.*

A. I. NEUSTADT, J. P. SCHERLACHER, R. GOLDMAN, *Assistant Examiners.*